US012597368B2

(12) United States Patent
Runyan et al.

(10) Patent No.: US 12,597,368 B2
(45) Date of Patent: Apr. 7, 2026

(54) ROOFING MODEL KIT THAT IS A SCALABLE REPLICA OF A COMMERCIAL ROOFING SYSTEM

(71) Applicant: BMIC LLC, Dallas, TX (US)

(72) Inventors: Benjamin Runyan, Dallas, TX (US); Van Taylor, Dallas, TX (US); Cameron Baher, Dallas, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 19/284,173

(22) Filed: Jul. 29, 2025

(65) Prior Publication Data

US 2025/0378770 A1 Dec. 11, 2025

Related U.S. Application Data

(63) Continuation of application No. 19/230,904, filed on Jun. 6, 2025.

(60) Provisional application No. 63/662,665, filed on Jun. 21, 2024, provisional application No. 63/656,966, filed on Jun. 6, 2024.

(51) Int. Cl.
*G09B 25/04* (2006.01)
(52) U.S. Cl.
CPC .................................... *G09B 25/04* (2013.01)
(58) Field of Classification Search
None
See application file for complete search history.

(56) References Cited

U.S. PATENT DOCUMENTS

| | | | |
|---|---|---|---|
| 2012/0221492 A1* | 8/2012 | Herro | G06Q 30/00 |
| | | | 52/173.1 |
| 2014/0315466 A1* | 10/2014 | Murtagh | G09B 25/04 |
| | | | 446/124 |
| 2019/0357457 A1 | 11/2019 | Hartman | |
| 2023/0141991 A1 | 5/2023 | Bartnik et al. | |
| 2023/0405979 A1 | 12/2023 | Rofrano et al. | |

FOREIGN PATENT DOCUMENTS

JP 2017-198002 A 11/2017

* cited by examiner

Primary Examiner — James B Hull
(74) Attorney, Agent, or Firm — GREENBERG TRAURIG, LLP

(57) ABSTRACT

A roofing mock-up kit includes a container having at least two sides, at least one side is clear so as to visually display contents within the container, and at least three modular interchangeable roofing components, the at least three modular interchangeable roofing components configured to be assembled by a user, the modular interchangeable roofing components positionable in an assembled state within the container to form a scale replica of a roofing system, the modular interchangeable roofing components including at least one distinct interchangeable base layer, at least one distinct interchangeable insulation layer, and at least one distinct membrane layer.

20 Claims, 21 Drawing Sheets

100

300

200

700

600

500

400

ROOFING MODEL KIT THAT IS A SCALABLE REPLICA OF A COMMERCIAL ROOFING SYSTEM

CROSS-REFERENCE TO RELATED APPLICATIONS

The present application is a continuation of U.S. patent application Ser. No. 19/230,904, filed Jun. 6, 2025, entitled "A ROOFING MODEL KIT THAT IS A SCALABLE REPLICA OF A COMMERCIAL ROOFING SYSTEM," which claims priority to and benefit of U.S. Provisional Patent Application No. 63/656,966, filed Jun. 6, 2024, entitled "ROOFING MODEL KIT THAT IS A SCALABLE REPLICA OF A COMMERCIAL ROOFING SYSTEM", and U.S. Provisional Patent Application No. 63/662,665, filed Jun. 21, 2024, entitled "ROOFING MODEL KIT THAT IS A SCALABLE REPLICA OF A COMMERCIAL ROOFING SYSTEM", the entirety of which are herein incorporated by reference.

FIELD

The present invention relates to a tangible, three-dimensional model that can provide a clearer, more interactive understanding of the roofing industry.

BACKGROUND

The roofing industry is a complex field requiring various layers to ensure a roof's durability, weather resistance, and energy efficiency. As a result, individuals should understand the construction, layering and aesthetics of roofing systems. Such understanding covers individuals including customers, roofing contractors, construction companies, building owners and managers, facilities maintenance teams, architects and engineers, roofing consultants, and roofing salespeople. Additionally, explaining the intricacies of different roofing systems to such individuals can be difficult using only diagrams or verbal explanations.

SUMMARY OF THE INVENTION

In some embodiments, the techniques described herein relate to a roofing mock-up kit including: a container including at least two sides, wherein at least one side is clear so as to visually display contents within the container; and at least three modular interchangeable roofing components, wherein the at least three modular interchangeable roofing components configured to be assembled by a user, wherein the modular interchangeable roofing components positionable in an assembled state within the container to form a scale replica of a roofing system, wherein the modular interchangeable roofing components including: at least one distinct interchangeable insulation layer; at least one distinct interchangeable cover board layer; and at least one distinct interchangeable membrane layer.

In some embodiments, the techniques described herein relate to a roofing mock-up kit, wherein the at least one distinct interchangeable insulation layer is a rigid insulation sheet.

In some embodiments, the techniques described herein relate to a roofing mock-up kit, wherein the at least one distinct interchangeable cover board layer is a polyiso board.

In some embodiments, the techniques described herein relate to a roofing mock-up kit, wherein the at least one distinct interchangeable membrane layer is a TPO layer.

In some embodiments, the techniques described herein relate to a roofing mock-up kit, wherein each of the at least three modular interchangeable roofing components having individual structural elements equivalents to conventional elements used in roofing construction for approximate obtainment of behavior of a real roofing condition.

In some embodiments, the techniques described herein relate to add other typical combinations for a roof.

In some embodiments, the techniques described herein relate to a method of assembling a scale replica of a roofing system from a roofing mock-up kit, including the steps of: (a) selecting a first modular interchangeable roofing component from at least a plurality of distinct interchangeable insulation layers; (b) positioning the first modular interchangeable roofing component within a container; (c) selecting a second modular interchangeable roofing component from at least a plurality of distinct interchangeable cover board layers; (d) positioning the second modular interchangeable roofing component on the first modular interchangeable roofing component within the container; (e) selecting a third modular interchangeable roofing component from at least a plurality of distinct interchangeable membrane layers; (f) positioning the third modular interchangeable roofing component on the first modular interchangeable roofing component within the container to form a first scale replica of a first roofing system within the container; (g) disassembling the first scale replica of the first roof; and (h) repeating step a) through f) to form a second scale replica of a second roofing system within the container, wherein the second scale replica of a second roofing system is different than the first scale replica of the first roofing system.

In some embodiments, the techniques described herein relate to a roofing method, wherein the first modular interchangeable roofing component is rigid insulation layer.

In some embodiments, the techniques described herein relate to a roofing method, wherein the second modular interchangeable roofing component is a cover board sheet.

In some embodiments, the techniques described herein relate to a roofing method, wherein the third modular interchangeable roofing component is a TPO layer.

In some embodiments, the techniques described herein relate to a roofing method, wherein each of the at least three modular interchangeable roofing components having individual structural elements equivalents to conventional elements used in roofing construction for approximate obtainment of behavior of a real roofing condition.

BRIEF DESCRIPTION OF THE DRAWINGS

This section refers to the drawings that form a part of this disclosure, and which illustrate embodiments of materials and methods described herein.

DETAILED DESCRIPTION

Figure 1:
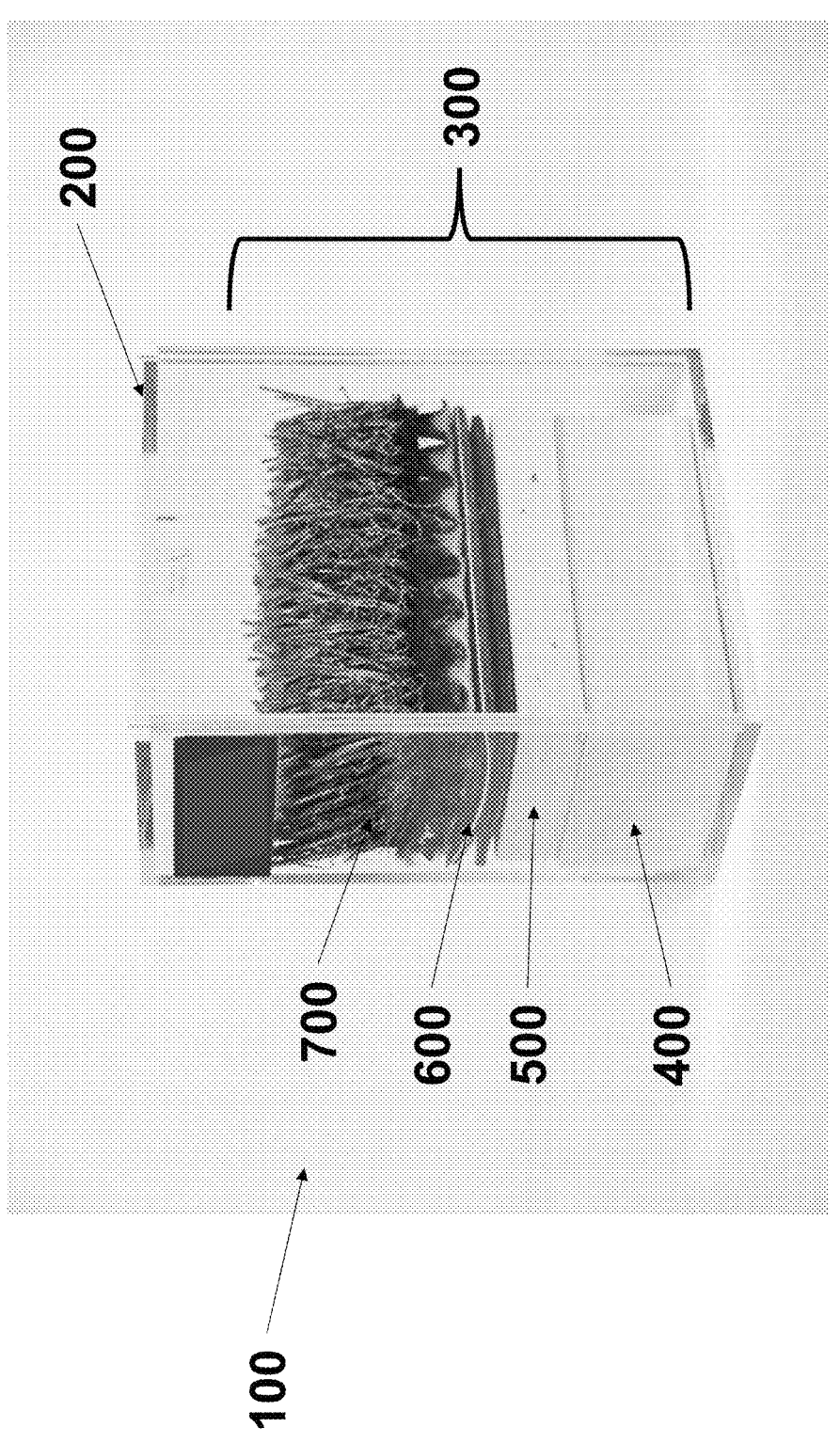
FIG. 1 is a perspective view of a roofing mock-up kit including a container and a plurality of modular interchangeable roofing components in the container, in accordance with some embodiments of the invention.

In addition to the benefits and improvements that the Specification discloses, other objects and advantages that the Specification provides will become apparent from the following description taken in conjunction with the accompanying figures.

Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," and any similar phrase, do not limit the scope of a specific claim to the materials or steps recited by the claim.

In some embodiments, the roofing mock-up kit of the present invention is an interactive tool that can accurately represent the layers of a roofing system. The kit allows users to physically manipulate and visibly view the different layers of a roofing system, leading to a better understanding of its construction and function. In one example, the kit can also serve as an excellent visual aid during client consultations, sales presentations, or educational training sessions. In another example, the kit allows users to physically manipulate and visibly view the different layers of a roofing system based on different codified systems. In yet another example, the kit can also be used to provide a cost estimate for the alternative roofing systems. In yet another example, the kit demonstrates individual structural elements equivalents to conventional elements used in roofing construction for approximate obtainment of behavior of a real roofing condition.

In some embodiments, users of the mock-up kit and method thereof include, but are not limited to, customers, roofing contractors, construction companies, building owners and managers, facilities maintenance teams, architects and engineers, roofing consultants, roofing salespeople and any combination thereof.

In some embodiments, the roofing mock-up kit and method thereof is assembled to form a scale replica of a roofing system. In some embodiments, the roofing mock-up kit is assembled to form a scale replica of a roofing system that consists of several layers.

In some embodiments, the mock-up kit and method thereof have a container. The container comprises at least two sides that are clear so as to visually display contents within the container. In some embodiments, the sides are made of clear plexiglass or similar material. As illustrated in the figures, the mock-up kit assembly generally comprises a container having a bottom and three perimeter walls (i.e., sides) attached to and extending upwardly from the bottom. An access opening into an interior of the container is in the back of the container. In some embodiments, the mock-up kit assembly generally comprises a container having a bottom and four perimeter walls attached to and extending upwardly from the bottom. In some embodiments, a top edge of the container defines an access opening into an interior of the container. In some embodiments, a lid is removably coupled to the container. The lid is positionable over the top edge and the perimeter wall of the container such that the lid selectively closes the access opening. In some embodiments, the lid may have a handle for ease of carrying. In some embodiments, the mock-up kit assembly includes a top that is connected to the three walls.

In some embodiments, at least three modular interchangeable roofing components are provided to form a model of a roofing system. The interchangeable roofing components are configured to be assembled by a user. The interchangeable roofing components are positionable in an assembled state when each of the interchangeable roofing components is positioned to associated ones of the interchangeable roofing components. The interchangeable roofing components have a size and shape for positioning within the interior of the container when the interchangeable roofing components are unassembled.

In some embodiments, the roofing mock-up kit and method thereof has at least three modular interchangeable roofing components. A user assembles the at least three modular interchangeable roofing components and positionable in an assembled state within the container to form a scale replica of a low slope roofing system. In some embodiments, a user picks and chooses from numerous layers to create a scale replica of the low slope roofing system that may include at least one distinct interchangeable insulation layer; at least one distinct interchangeable cover board layer; and at least one distinct interchangeable membrane layer. In some embodiments, a user picks and chooses from numerous layers to create a scale replica of the low slope roofing system that may include at least one distinct interchangeable deck layer; at least one distinct interchangeable cover board layer; and at least one distinct interchangeable membrane layer. In some embodiments, a user picks and chooses from numerous layers to create a scale replica of the low slope roofing system that may include at least one distinct interchangeable concrete deck layer; at least one distinct interchangeable vapor barrier layer; and at least one distinct interchangeable membrane layer. In some embodiments, a user picks and chooses from numerous layers to create a scale replica of the low slope roofing system that may include at least one distinct interchangeable concrete deck layer; at least one distinct interchangeable vapor barrier layer; and at least one distinct interchangeable membrane layer with an ISO and/or cover board layer.

In some embodiments, the at least one distinct interchangeable insulation layer may include, for example, one or more of the following and any combination thereof: Insulation Layer (e.g., a layer that maintains the internal temperature of the building, and/or that slows the transfer of heat to and/or from the building to an external environment, and which, for example can be made of polyisocyanurate (polyiso), expanded polystyrene (EPS), or extruded polystyrene (XPS)). In one example, the insulation layer is two or more layers of the same or different composition.

In some embodiments, the at least one distinct interchangeable cover board layer may include, for example, one or more of the following and any combination thereof of: gypsum, gypsum fiber; asphaltic; mineral wool; perlite; wood fiber; high-density polyisocyanurate and/or polyiso foam core with a coated glass facers. In some embodiments, there may be more than one cover board layer. In one example, the cover board layer is two or more layers of the same or different composition. In some embodiments, at least one distinct interchangeable membrane layer may include, for example, one or more of the following and any combination thereof: Roofing Membrane Layer. The roofing membrane layer may provide water-resistance and weather-resistance for the roof. The membrane layer, for example, can be made from various materials, including TPO (thermoplastic olefin), EPDM (ethylene propylene diene monomer), PVC (polyvinyl chloride), SBS or APP polymer modified bitumen, BUR Oxidized asphaltic membranes, PMMA (polymethyl methacrylate) or roof coatings such as acrylic or silicone and/or modified bitumen. Examples may also include one or more of the following and any combination thereof: PVC fleece back membranes (e.g. top layer of PVC membrane and bottom layer of polyester fleeces backing laminated to the membrane); PVC membranes; TPO fleece back membrane (e.g. top layer of TPO membrane and bottom layer of polyester fleeces backing laminated to the membrane); TPO membrane; TPO membrane layer with factory applied adhesive layer; and/or TPO membrane with an embossed surface for traction and slip resistance for walkway areas. In one example, the membrane layer is two or more layers of the same or different composition.

In some embodiments, in addition to the cover board, insulation and membrane layer, another layer may include at least one distinct interchangeable base layer. Suitable base layers may include one or more of the following and any combination thereof of a roof deck layer (e.g., a foundation layer of a roof, which is typically made of metal, concrete, or wood, and which typically, provides a solid base for the other layers to be installed on). In some embodiments, there may be more than one base layer. In one example, the base layer is two or more layers of the same or different composition.

In some embodiments, a user may pick and choose modular interchangeable roofing components from a roofing mock-up kit to create a scale replica of the roofing system by the following steps:

a) selecting a first modular interchangeable roofing component from at least a plurality of distinct interchangeable insulation layers;

b) positioning the first modular interchangeable roofing component within a container;

c) selecting a second modular interchangeable roofing component from at least a plurality of distinct interchangeable cover board layers;

d) positioning the second modular interchangeable roofing component on the first modular interchangeable roofing component within the container;

e) selecting a third modular interchangeable roofing component from at least a plurality of distinct interchangeable membrane layers;

f) positioning the third modular interchangeable roofing component on the first modular interchangeable roofing component within the container to form a first scale replica of a first roof system within the container;

g) disassembling the first scale replica of the first roof; and h) repeating step a) through f) to form a second scale replica of a second roofing system within the container, wherein the second scale replica of a second roofing system is different than the first scale replica of the first roofing system.

In some embodiments, it is also understood that the above method includes that a user can select one or more modular interchangeable roofing components before positioning the one or more modular interchangeable roofing components within the container.

In some embodiment, in addition to the insulation, cover board and membrane layers, a user may pick and choose from numerous other layers, sub-layers, or components, to create a scale replica of the low slope roofing system which may also include one or more of the following and any combination thereof:

Vapor Barrier Layer: This is used to inhibit moisture penetrating of the roof system. The roof barrier layer may be installed directly on the roof deck. Examples include, but are not limited to, a tri laminated woven polyethylene facer, butyl rubber adhesive layer and an underside that has a split silicone release film that is removed during installation;

Roofing felt (e.g., glass fiber mat, coated with asphalt and optionally, a bottom surface perforated with holes to allow mopping asphalt to flow through during installation);

Surfacing Layer: In some embodiment, a surfacing layer may be applied to protect the membrane from sunlight and weather. For example, the surfacing layer may be a reflective coating, gravel, or a layer of pavers; and/or Modified bitumen roofing systems ("Modbit"): Examples may include one or more of the following and any combination thereof: modified bitumen membrane (e.g., bitumen base with a non-woven polyester reinforcing mat); granule membrane (e.g. non-woven polyester mat, coated with asphalt and covered with mineral granules); and/or smooth membrane (e.g. non-woven polyester mat, coated with asphalt). Examples of the type of polymer that can be added to the asphalt include atactic polypropylene ("APP") and styrene butadiene styrene ("SBS"). In one example, a hybrid assembly of SBS and APP can be used as layers in the kit.

In some embodiments, the roofing mock-up kit includes modular interchangeable roofing components with customizable color options, allowing users to simulate different aesthetic choices for roofing systems. These options may include bright white, off-white, green, gray, black, and custom colors such as red, aqua, or tan. Examples include, but are not limited to, for Coverboards: Bright white, Off White, Green, Grey, Black; for membranes: Custom Colors (such as Red, Green, Aqua), Tan, Grey, White; for Asphaltic layers: Standard White, Black, Tan, Bright White; and for Walk pads: Bright White, Grey, Yellow, Black, Standard White.

In some embodiments, a user may pick and choose from numerous layers to create a scale replica of the roofing system that may include one or more of the following and any combination thereof: one or more thickness for each layer. Examples include Single Ply Membrane thickness: 45 mil, 60 mil, 80 mil, 115 mil; Modified Bitumen Membrane thickness: 60 mil, 87 mil, 90 mil, 120, mil, 140 mil, 160 mil; Coverboard thickness: $\frac{1}{4}$", $\frac{3}{16}$", $\frac{1}{2}$" $\frac{3}{4}$", $\frac{5}{8}$"; and Polyisocyanurate thickness: 1"-14".

In some embodiments, the roofing mock-up kit and method thereof is assembled to form a scale replica of a roofing system. In some embodiments, the roofing mock-up kit and method thereof is assembled to form a scale replica of a low slope roofing system that consists of several layers. In some embodiments, a user picks and chooses from numerous layers to create a scale replica of the low slope roofing system may include one or more of the following and any combination thereof: a green roof layer, sub-assembly, or assembly; Adhesives (e.g., Matrix 101, 102, 103, 201, 202; Quick Spray, Low Rise Foam (Ribbon or Splatter Pattern Applied), OlyBond 500, Bonding Adhesive); Fasteners (mechanical) (e.g. Standard Fasteners 1-$\frac{5}{8}$"-8"; Heavy Duty (HD) Fasteners 1-$\frac{1}{4}$"-24"; Extra HD Fasteners 2"-12", Termination Bar; Purlin Fasteners, Zinc Masonry Fasteners, CD Fasteners, Weldable metal plates, metal insulation plates and LWIC fasteners and/or Accessories (e.g. Primers (Matrix 307), Cut Edge Sealant, Tape Primers, Sealant (Caulking), TPO Conductive Primer)

In some embodiments, examples of a green roof layer, sub-assembly, or assembly may include one or more of the following and any combination thereof: Vegetation (plants, grasses, etc.); Growing Medium (engineered soil/growing media); Filter Fabric; Drainage Layer (often a drainage composite); Optionally: Soil Foam layer (e.g., EPS geofoam); Root Barrier Layer (e.g., high-density polyethylene (HDPE) sheets, reinforced thermoplastic weldable liner); Protection/Insulation Layer (optionally); Waterproofing Membrane; and/or Roof/Structural support.

In some embodiments, the mock-up kit and method thereof may also include flashing. In some embodiments, flashing is installed at the roof edges, penetrations, and wherever the roof meets a vertical surface. In some embodiments, the design is configured to inhibit water from entering the roof system.

In some embodiments, the modular interchangeable roofing components positionable in an assembled state within the container to form a scale replica of a low slope roofing system may include one or more of the foregoing and any combination thereof:

In some embodiments, the roofing mock-up kit and method thereof can include modular interchangeable roofing components of an ISO cover board and/or a TPO fleece back in splatter pattern with a low-rise foam adhesive. In some embodiments, the roofing mock-up kit and method thereof can include modular interchangeable roofing components of an ISO cover board and/or a smooth TPO fleece back with mechanical fasteners.

In some embodiments, the mock-up kit can include modular interchangeable roofing components of a Roof Deck (concrete, metal, wood, etc.); Insulation Layer(s) (e.g., rigid insulation boards like polyisocyanurate or extruded polystyrene); Cover Board; Vapor Retarder (optionally) (e.g., self-adhered vapor retarders); Adhesive/Fasteners (e.g., used to attach the fleece-backed TPO membrane); TPO Fleece-Back Membrane (e.g., primary waterproofing layer, composed of a TPO membrane with a polyester fleece backing laminated to the underside); and Membrane Flashings/Terminations) e.g., fleece-backed membrane may be used for flashing details and terminations).

In some embodiments, one or more of the modular interchangeable roofing components have individual structural elements equivalent to conventional elements used in roofing construction for approximate obtainment of behavior of a real roofing condition. In one example, the modular interchangeable roofing component is a small piece of the actual roofing component used on a building. For example, the modular interchangeable roofing components of a membrane may be a small piece of the actual membrane. In another example, the modular interchangeable roofing components is a custom-made piece for the kit to simulate the actual roofing component.

In some embodiments, the roofing mock-up kit includes educational features, such as printed guides or digital resources, to educate users on the construction and functionality of different roofing systems. These features may enhance the kit's utility for training and instructional purposes.

Figure 2:
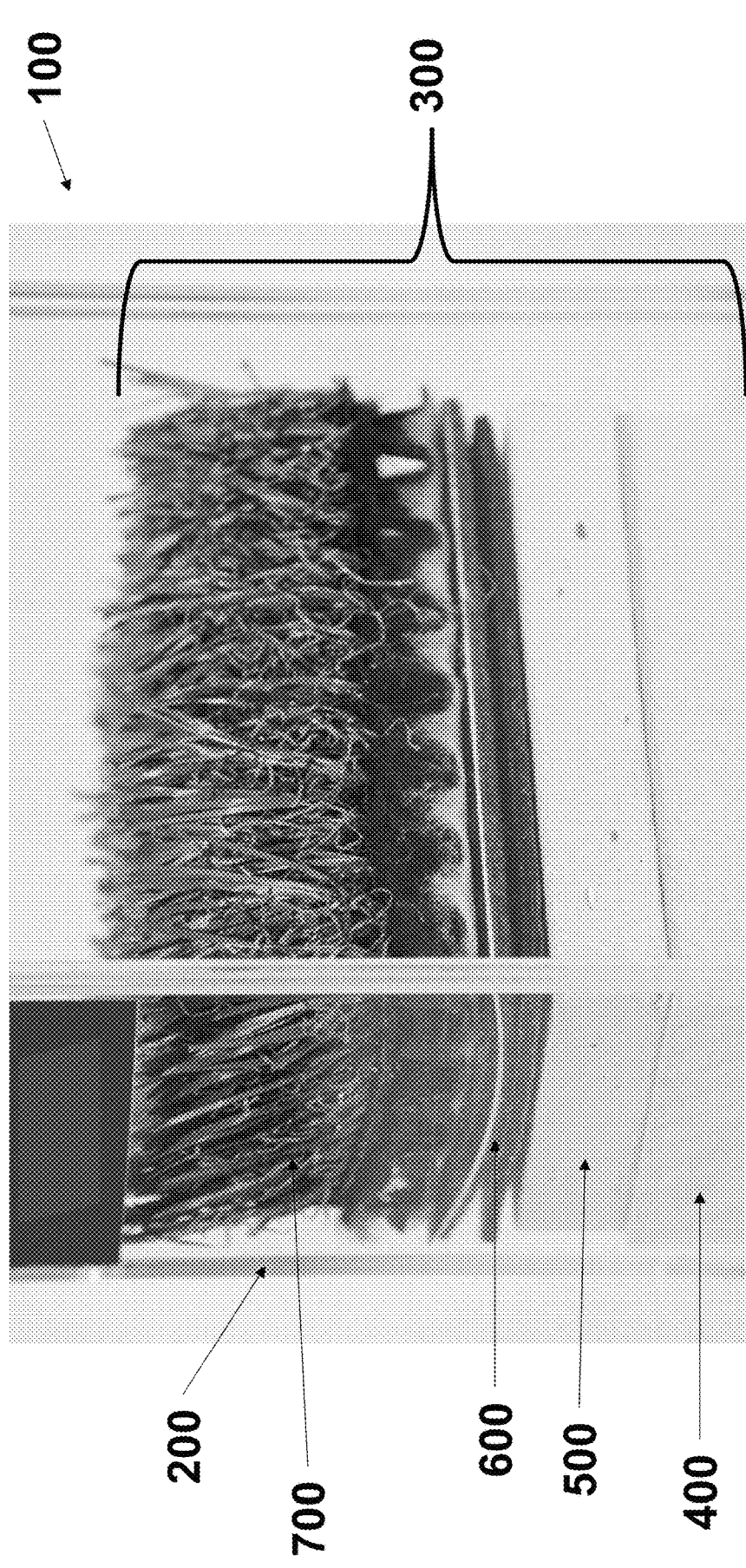
FIG. 2 is an enlarged view of a portion of the roofing mock-up kit of FIG. 1, in accordance with some embodiments of the invention.
Figure 3:
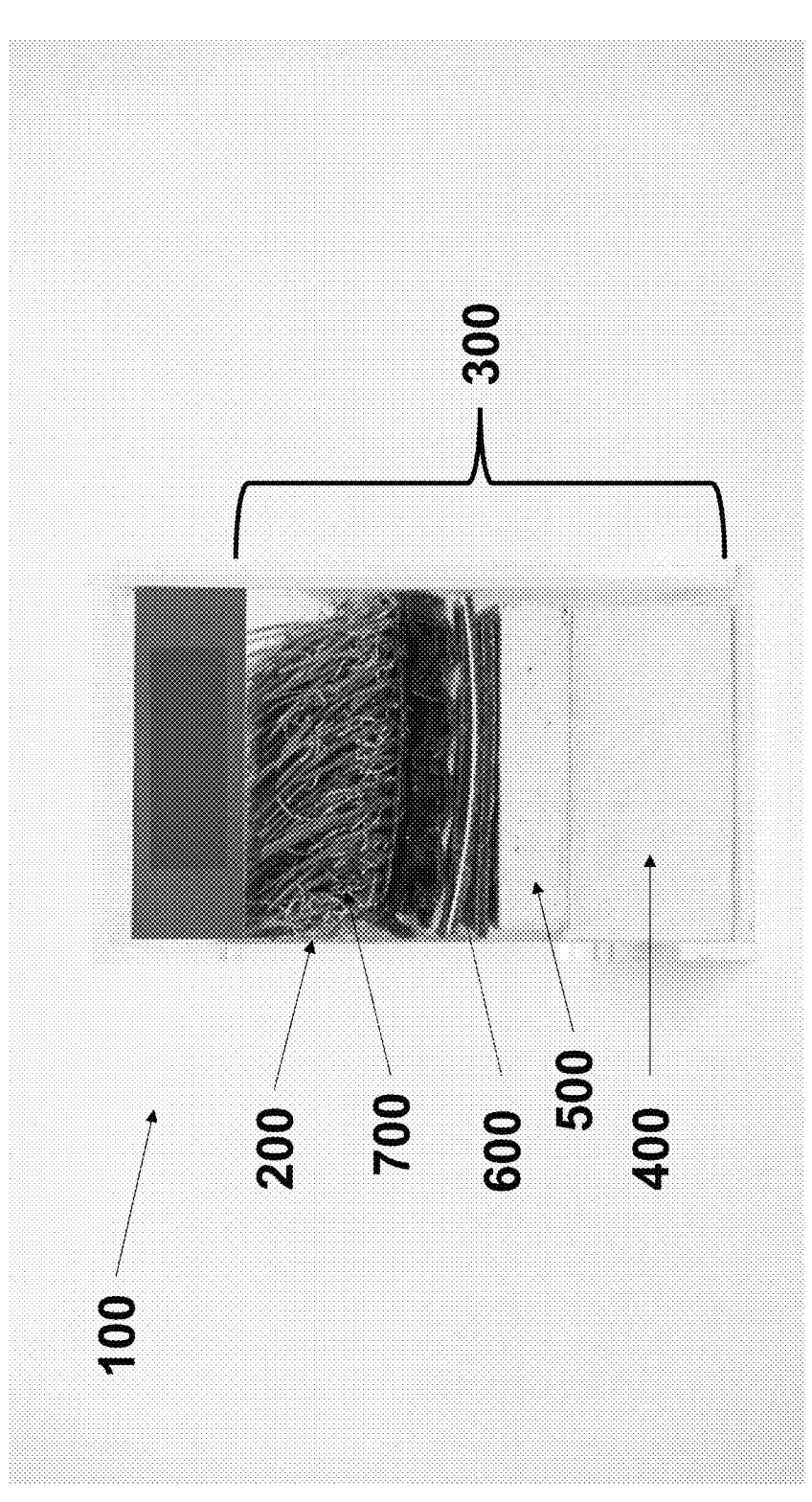
FIG. 3 is a side view of the roofing mock-up kit of FIG. 1, in accordance with some embodiments of the invention.

With reference to the figures, FIG. 1 is a perspective view of a roofing mock-up kit 100, FIG. 2 is an enlarged view of a portion of the roofing mock-up kit 100 of FIG. 1, and FIG. 3 is a side view of the roofing mock-up kit of FIG. 1, in accordance with some embodiments of the invention. As FIGS. 1-3 show, in some embodiments, roofing mock-up kit 100 includes the container 200, and at least three modular interchangeable roofing components 300 installed within the container, thereby providing the replica of a roofing system. In some embodiments, the container 200 is in accordance with one or more of the embodiments described above. In some embodiments of the invention, the interchangeable roofing components 300 are configured to be assembled by a user, as described. Thus, in some embodiments, the interchangeable roofing components 300 are positionable, by the user, in an assembled state within the container 200 to form the scale replica of the roofing system.

As FIGS. 1-3 show, in some embodiments, the modular interchangeable roofing components 300 include at least one distinct interchangeable insulation layer 400, at least one distinct interchangeable cover board layer 500, and at least one distinct interchangeable membrane layer 600. In some embodiments, distinct means that the modular interchangeable roofing components 300 are provided separate from one another. In some embodiments, one or more, or all, of the interchangeable insulation layer 400, the interchangeable cover board layer 500, and/or the interchangeable membrane layer 600 are as described above. As FIGS. 1-3 also show, in some embodiments, the roofing mock-up kit 100 includes a green layer 700. In some embodiments, the green layer 700 is in accordance with the above description.

Although FIGS. 1-3 show an embodiment including one interchangeable insulation layer 400, as described above, in some embodiments, the roofing mock-up kit 100 includes more than one interchangeable insulation layer 400. However, in some embodiments, as described, the roofing mock-up kit 100 includes at least one interchangeable insulation layer 400.

Further, although FIGS. 1-3 show an embodiment including one interchangeable cover board layer 500, as described above, in some embodiments, the roofing mock-up kit 100 includes more than one interchangeable cover board layer 500. However, in some embodiments, as described, the roofing mock-up kit 100 includes at least one interchangeable cover board layer 500.

Still further, although FIGS. 1-3 show an embodiment including more than one interchangeable membrane layer 600, as described above, in some embodiments, the roofing mock-up kit 100 includes less or more than the number of illustrating interchangeable membrane layers 600. However, in some embodiments, as described, the roofing mock-up kit 100 includes at least one interchangeable membrane layer 600. It is understood that, in some embodiments, the roofing mock-up kit 100 includes a greater number or lesser number of modular interchangeable roofing components 300, and that one or more of the interchangeable roofing components 300 are different that the specific interchangeable roofing components 300 illustrated in the embodiment of FIGS. 1-3.

Figure 4:
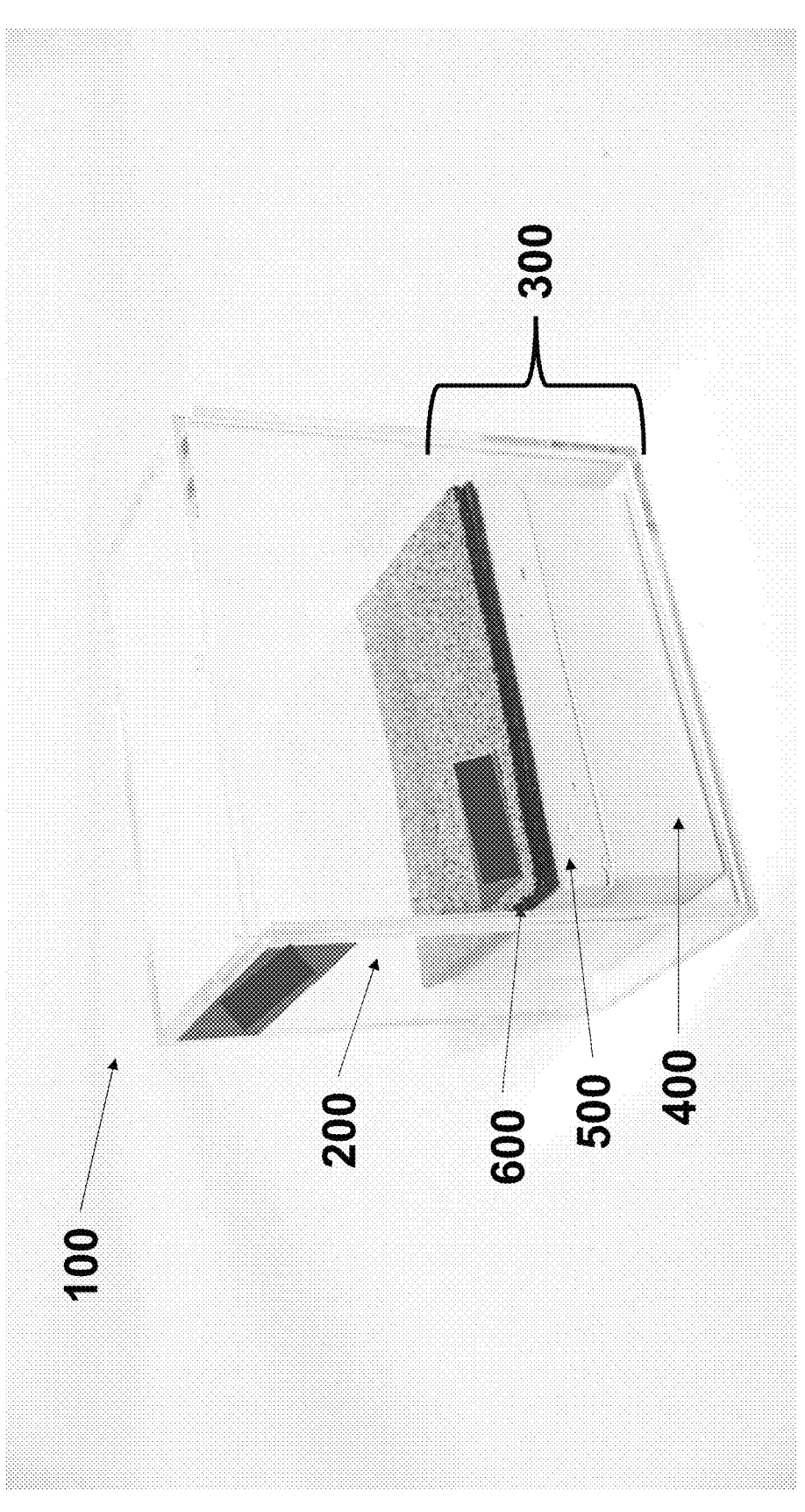
FIG. 4 is a perspective view of the roofing mock-up kit, in accordance with some embodiments of the invention.
Figure 5:
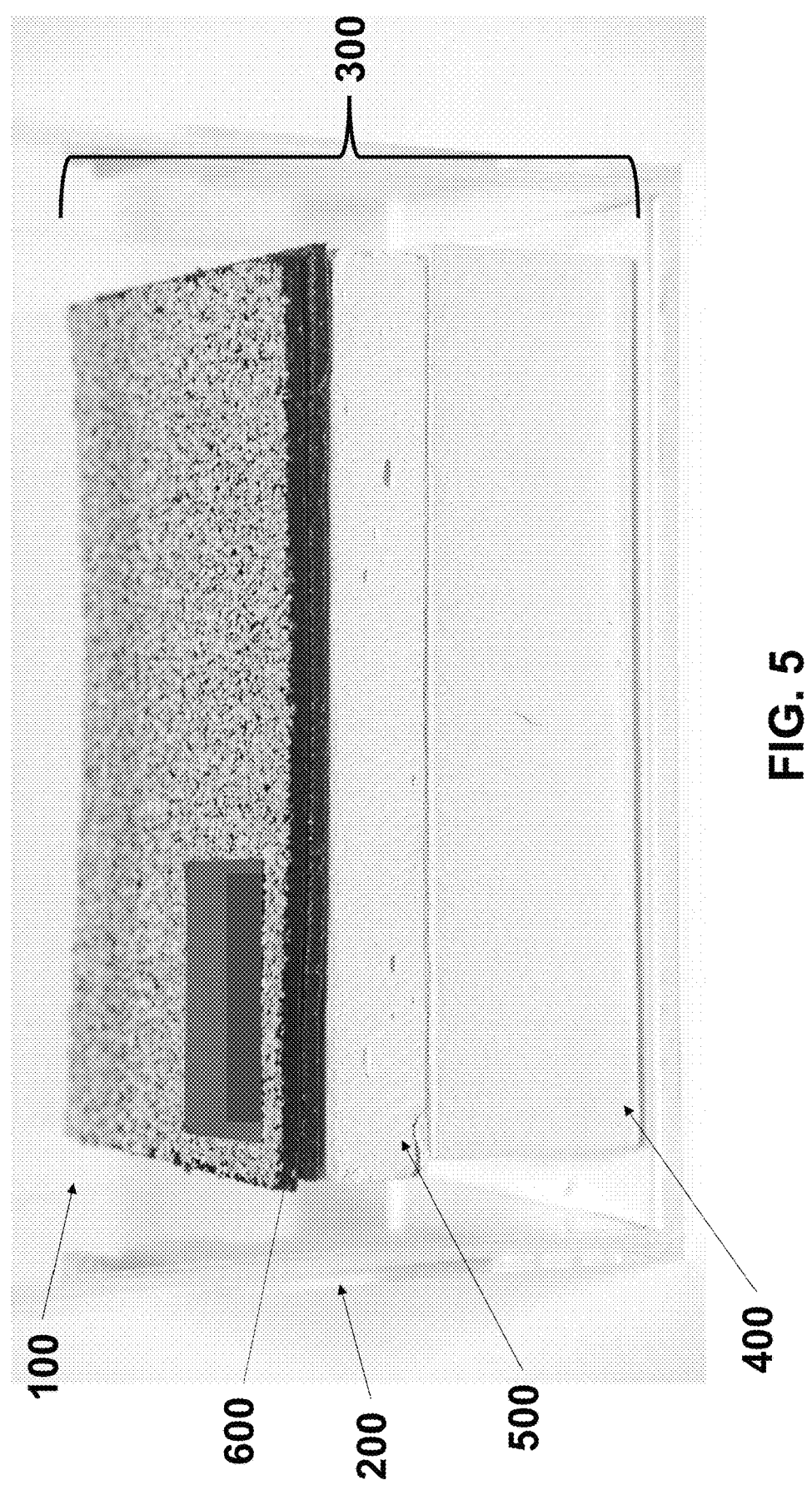
FIG. 5 is a perspective view of the roofing mock-up kit of FIG. 4, in accordance with some embodiments of the invention.

In some embodiments, for example, the roofing mock-up kit 100 omits the green layer 700. FIG. 4 is a perspective view the roofing mock-up kit 100, and FIG. 5 is a front perspective view of the roofing mock-up kit of FIG. 4, in accordance with some embodiments of the invention. As FIGS. 4 and 5 show, in some embodiments, the roofing mock-up kit 100 includes the container 200, and at least three modular interchangeable roofing components 300, such as at least one of the interchangeable insulation layer 400, the interchangeable cover board layer 500, and the interchangeable membrane layer 600, while omitting the green layer 700.

In accordance with the above discussion, although FIGS. 4 and 5 show an embodiment including one interchangeable insulation layer 400, in some embodiments the roofing mock-up kit 100 includes more than one interchangeable insulation layer 400. However, in some embodiments, as described, the roofing mock-up kit 100 includes at least one interchangeable insulation layer 400. Further, although FIGS. 4 and 5 show an embodiment including one interchangeable cover board layer 500, as described above, in some embodiments the roofing mock-up kit 100 includes more than one interchangeable cover board layer 500. However, in some embodiments, as described, the roofing mock-up kit 100 includes at least one interchangeable cover board layer 500. Still further, although FIGS. 4 and 5 show an embodiment including two interchangeable membrane layers 600, as described above, in some embodiments, the roofing mock-up kit 100 includes less or more than the number of illustrating interchangeable membrane layers 600. However, in some embodiments, as described, the roofing mock-up kit 100 includes at least one interchangeable membrane layer 600. It is understood that, in some embodiments, the roofing mock-up kit 100 includes a greater number or lesser number of interchangeable roofing components 300, and that one or more of the interchangeable roofing components 300 are different that the specific interchangeable roofing components 300 illustrated in FIGS. 4 and 5.

Figure 6:
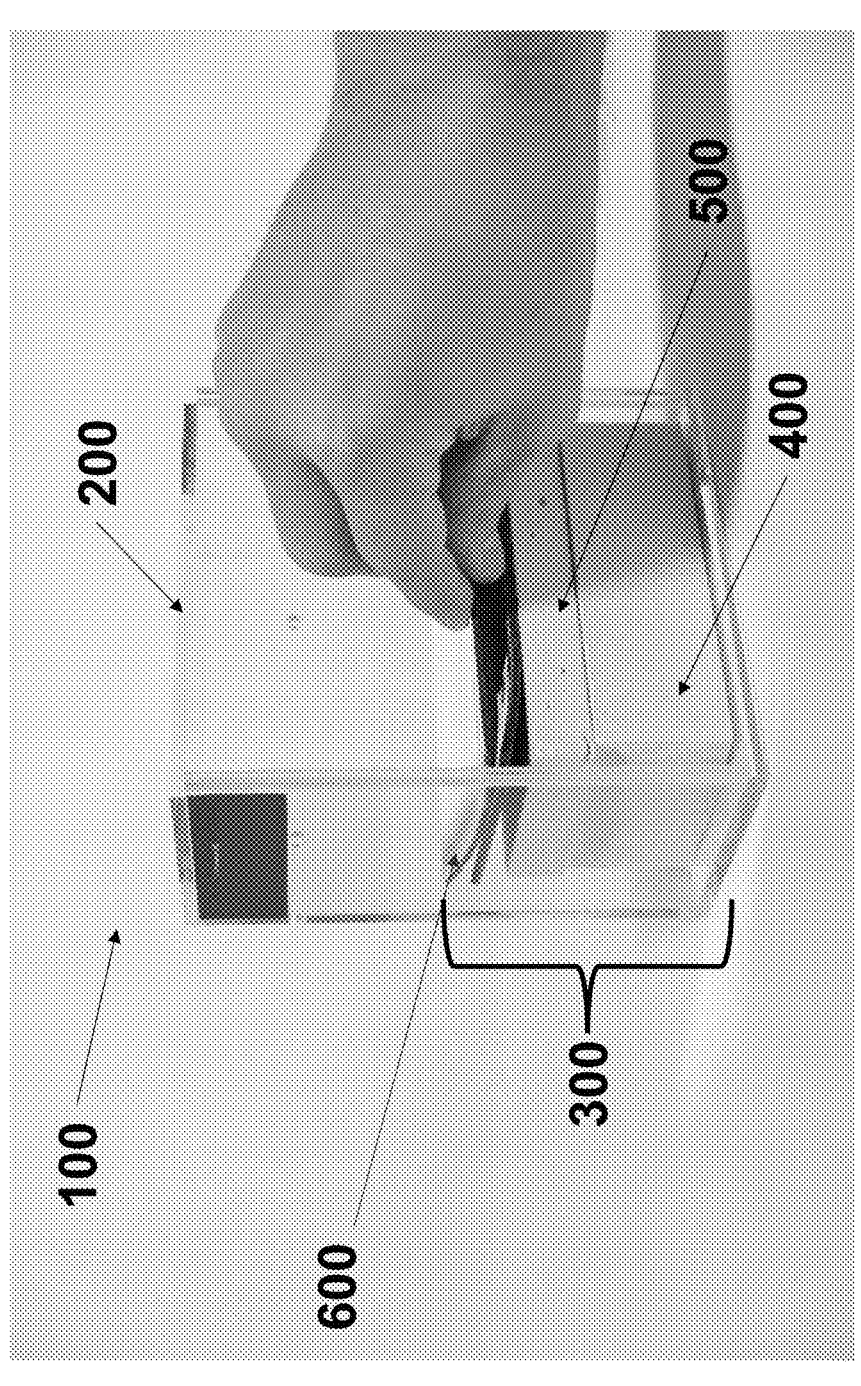
FIG. 6 is illustrative of a user placing numerous layers into the container to create a scale replica of the low scope roofing system of another embodiment of the present invention.

FIG. 6 is illustrative of a user placing specific layers into the container 200 to create a scale replica of the roofing system, in accordance with some embodiments of the invention. Specifically, FIG. 6 shows an embodiment in which the user has placed, in the container 200, four modular interchangeable roofing components 300—one interchangeable insulation layer 400, one interchangeable cover board layer 500, and two interchangeable membrane layers 600. In accordance with the above discussion, although FIG. 6 shows an embodiment including one interchangeable insulation layer 400, in some embodiments the roofing mock-up kit 100 includes more than one interchangeable insulation layer 400. Further, although FIG. 6 shows an embodiment including one interchangeable cover board layer 500, as described above, in some embodiments, the roofing mock-up kit 100 includes more than one interchangeable cover board layer 500. Still further, although FIG. 6 shows an embodiment including two interchangeable membrane layers 600, as described above, in some embodiments, the roofing mock-up kit 100 includes less or more than the number of illustrating interchangeable membrane layers 600. It is understood that, in some embodiments, the roofing mock-up kit 100 includes a greater number or lesser number of interchangeable roofing components 300, and that one or more of the interchangeable roofing components 300 are different that the specific interchangeable roofing components 300 illustrated in FIG. 6.

Figure 7:
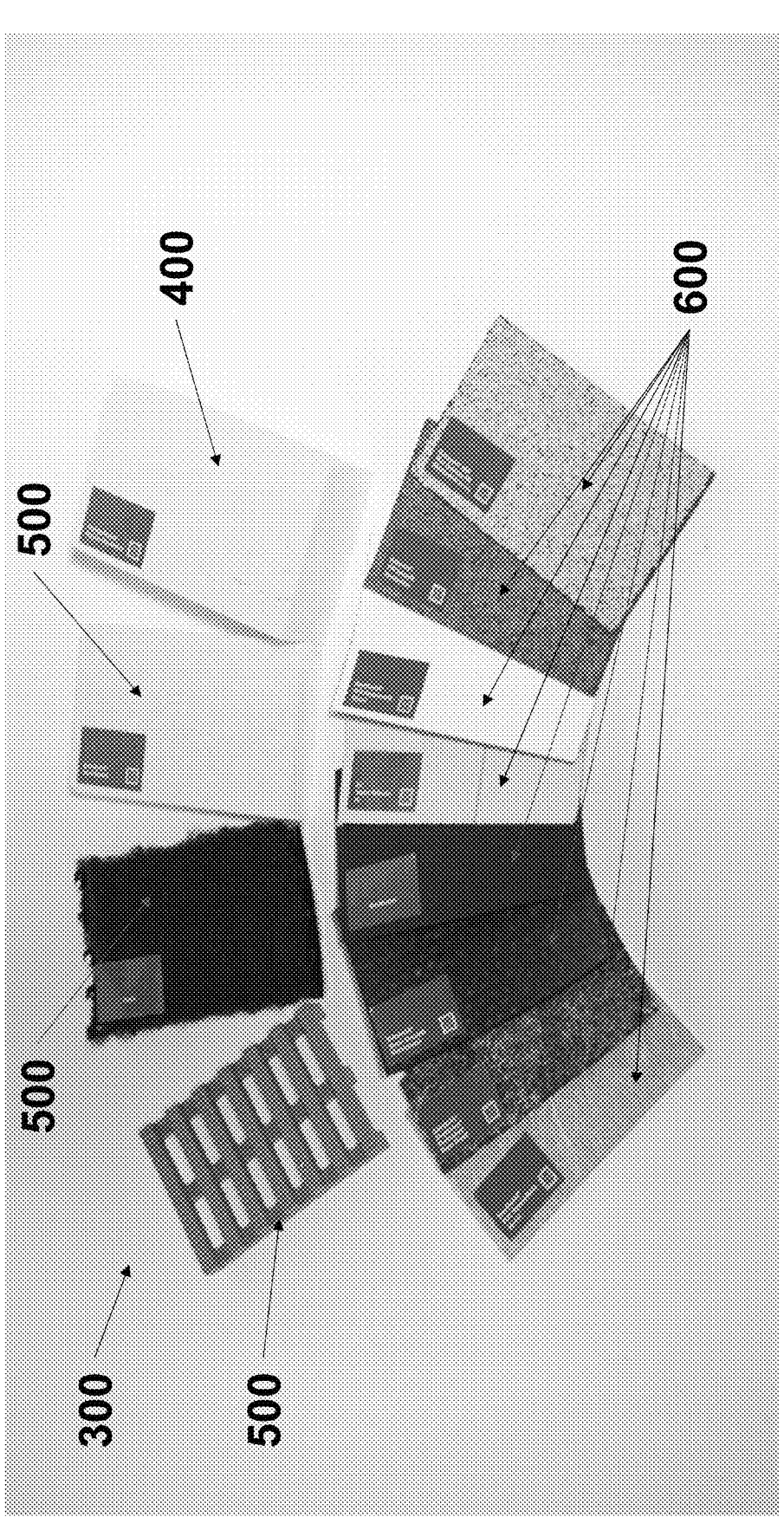
FIG. 7 is illustrative of a user picking and choosing from numerous layers to create a scale replica of the low scope roofing system of another embodiment of the present invention.
Figure 8:
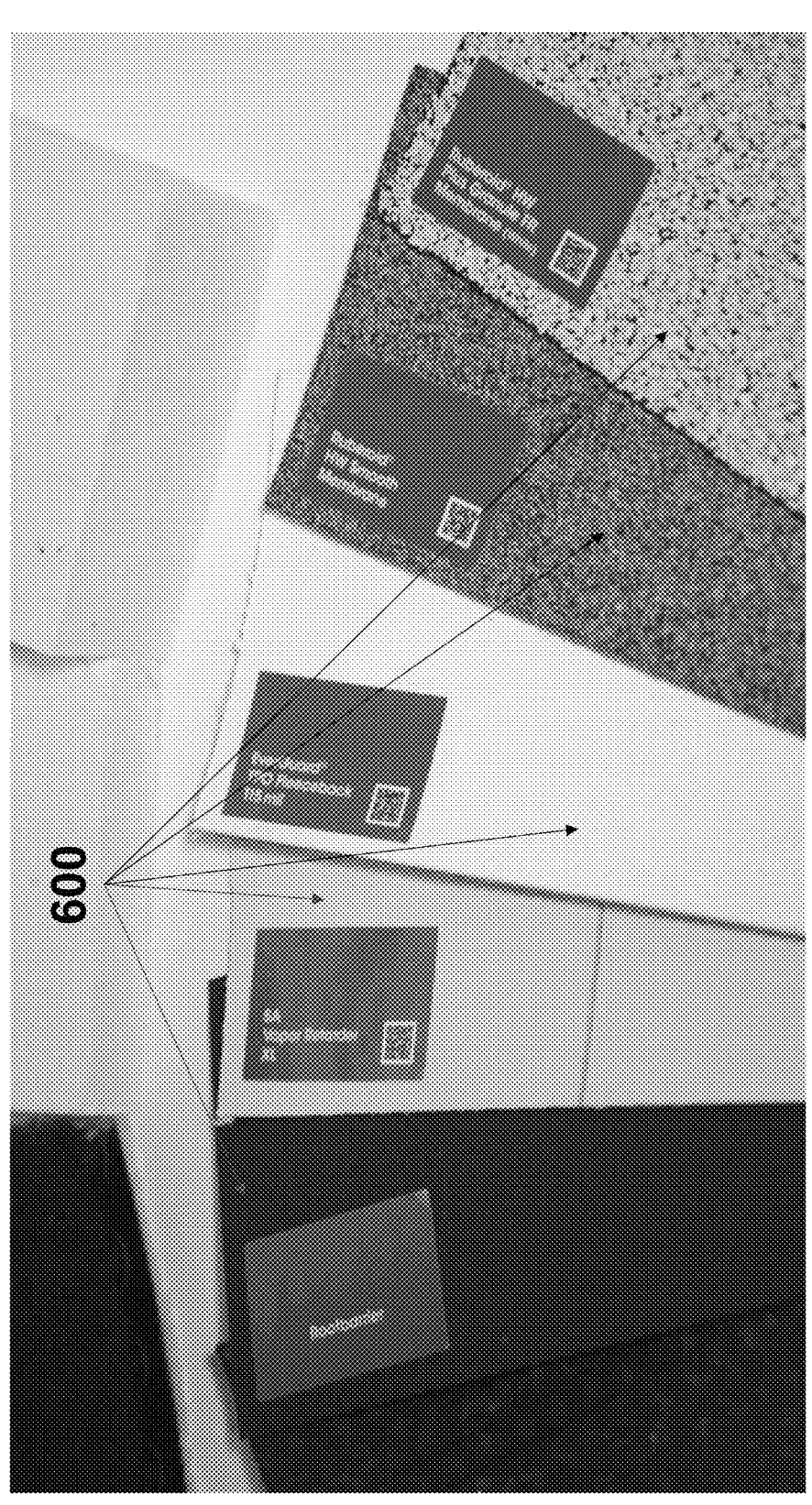
FIG. 8 is illustrative of a user picking and choosing from numerous layers to create a scale replica of the low scope roofing system of another embodiment of the present invention.

FIGS. 7 and 8 are illustrative of a user picking and choosing from numerous layers to create the scale replica of the roofing system, in accordance with some embodiments of the invention. FIGS. 7 and 8 show specific examples of various interchangeable roofing components 300. The figures show a non-limiting example of the interchangeable insulation layer 400, as a polyisocyanurate (polyiso) board. As discussed, however, it is understood that the interchangeable insulation layer 400 is not limited to a polyiso board, or to the specific polyiso board illustrated in the figures. In some embodiments, the roofing mock-up kit 100 includes more than one interchangeable insulation layer 400, and in some embodiments the roofing mock-up kit 100 includes one or more, or none, of the interchangeable insulation layer 400 as a polyiso board.

FIGS. 7 and 8 also show a non-limiting example of the interchangeable cover board layer 500, as a roof board. As discussed, however, it is understood that the interchangeable cover board layer 500 is not limited to a roof board, and/or is not limited to the specific roof board shown and described. Further, in some embodiments, the roofing mock-up kit 100 includes more than one interchangeable cover board layer 500, and in some embodiments includes one or more, or none, of the interchangeable cover board layer 500 as a roof board. Illustrated in FIG. 7 are a loose laid walk pad that is installed on a roof final surface; a drainage mat for green roof assemblies (e.g. installed over the roof barrier above the roof membranes to protect the roof membranes from vegetation that is growing on the roof); and a piece of gypsum fiber coverboard (e.g. a coverboard typically installed over Polyisocyanurate and below the roof membrane assembly to protect the ISO and provide a smooth surface for the membranes to be installed to).

FIGS. 7 and 8 also show non-limiting examples of the interchangeable membrane layer 600. In some embodiments, as FIGS. 7 and 8 show, the interchangeable membrane layer 600 is any of Ruberoid HW Plus Granule FR Membrane, Ruberoid HW Smooth Membrane, EverGuard TPO Fleeceback membrane, SA Vapor Retarder XL membrane, Roofbarrier membrane, Ruberoid Torch Smooth Membrane, GAFGLAS Perforated Roof Sheet, and/or Ever-Guard PVC Fleece-Back membrane, each sold by GAF, Inc. As discussed, however, it is understood that the interchangeable membrane layer 600 is not limited to any of the specific membrane layers shown and described. Further, in some embodiments, the roofing mock-up kit 100 includes more than one interchangeable membrane layer 600, and in some embodiments includes one or more, or none, of the interchangeable membrane layer 600 is one of the example membrane layers.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive. By way of further example, any of the disclosed layers from any of the embodiments may be combined with one or more layers from one or more of any of the other embodiments, to provide a roofing mock-up kit.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

Exemplary embodiments include, but are not limited to, the following. In some embodiments, a roofing mock-up kit comprising: a container comprising at least two sides, wherein at least one side is clear so as to visually display contents within the container; and at least three modular interchangeable roofing components, wherein the at least three modular interchangeable roofing components are configured to be assembled by a user, wherein the at least three modular interchangeable roofing components are positionable in an assembled state within the container to form a scale replica of a low slope roofing system, wherein the modular interchangeable roofing components comprising: at least one distinct interchangeable insulation layer; at least one distinct interchangeable cover board layer; and at least one distinct interchangeable membrane layer.

In some embodiments, the roofing mock-up kit wherein the at least one distinct interchangeable cover board layer is a polyiso sheet. In some embodiments, the roofing mock-up wherein the at least one distinct interchangeable insulation layer is a rigid insulation sheet. In some embodiments, the roofing mock-up kit wherein the at least one distinct interchangeable membrane layer is a TPO layer. In some embodiments, the roofing mock-up kit of claim 1, wherein each of the at least three modular interchangeable roofing components having individual structural elements equivalents to conventional elements used in roofing construction for approximate obtainment of behavior of a real roofing condition. In some embodiments, a method of assembling a scale replica of a low slope roofing system from a roofing mock-up kit, comprising the steps of: selecting a first modular interchangeable roofing component from at least a plurality of distinct interchangeable insulation layers; positioning the first modular interchangeable roofing component within a container; selecting a second modular interchangeable roofing component from at least a plurality of distinct interchangeable cover board layers; positioning the second modular interchangeable roofing component on the first modular interchangeable roofing component within the container; selecting a third modular interchangeable roofing component from at least a plurality of distinct interchangeable membrane layers; positioning the third modular interchangeable roofing component on the first modular interchangeable roofing component within the container to form a first scale replica of a first low slope roofing system within the container; disassembling the first scale replica of the first low slope roofing system; and repeating step a) through f) to form a second scale replica of a second low slope roofing system within the container, wherein the second scale replica of a second low slope roofing system is different than the first scale replica of the first low slope roofing system.

In some embodiments, the method wherein each of the first, second and third modular interchangeable roofing components having individual structural elements equivalents to conventional elements used in roofing construction for approximate obtainment of behavior of a real roofing condition. In some embodiments, the kit and/or method for approximate obtainment of behavior of a real roofing condition of a low slope roofing system or a steep slope roofing system.

FIGS. 9 through 12 also show non-limiting examples of additional interchangeable attachment styles. In some embodiments, as illustrated in FIGS. 9 through 12, these additional interchangeable attachments styles create a simulation of the actual appearance of the attachment on the roof. For example, FIG. 9 through 12 are photographs that illustrate different attachment styles that may be used to attach the one or more layers. These attachment styles are mere representations of the numerous attachment styles that can be produced (e.g., by printing different styles on a plastic substrate). In some embodiments, these additional interchangeable layers having individual construction elements equivalent to conventional elements used in roofing construction for approximate obtainment of behavior of a real roofing condition.

Figure 9:
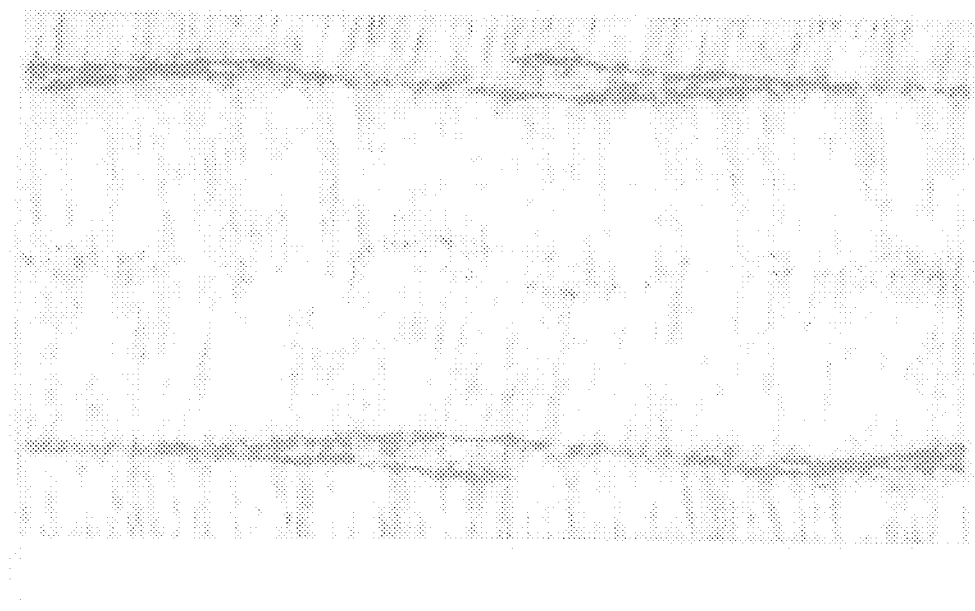
FIG. 9 illustrates a non-limiting example of the attachment style where the printed image simulates that appearance of a regular bonding adhesive (e.g., quickspray adhesive)

FIG. 9 illustrates a non-limiting example of the attachment style where the printed image simulates that appearance of a regular bonding adhesive.

Figure 10A:
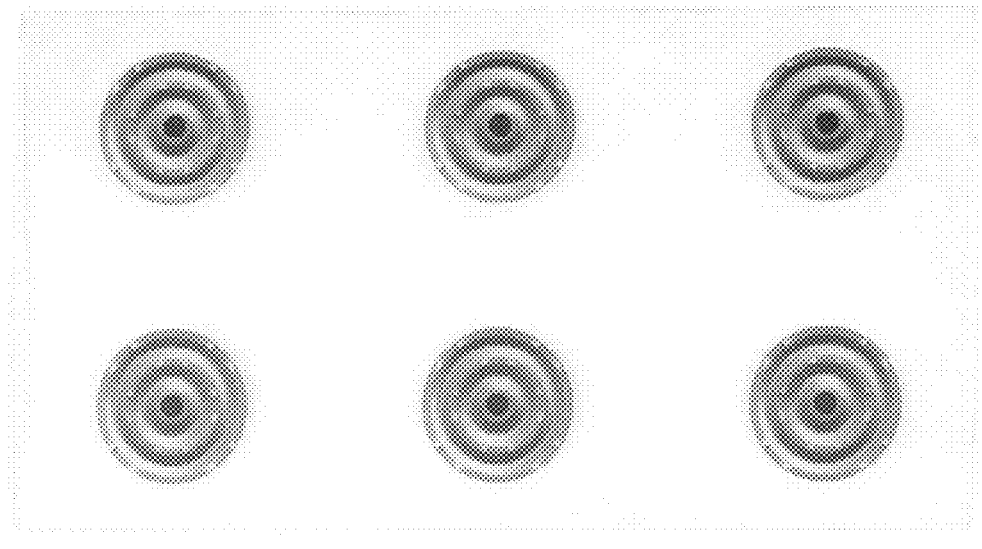
FIGS. 10A and 10B illustrates a non-limiting example of the attachment style where the printed image simulates that appearance of different types of mechanical plates and fasteners.
Figure 10B:
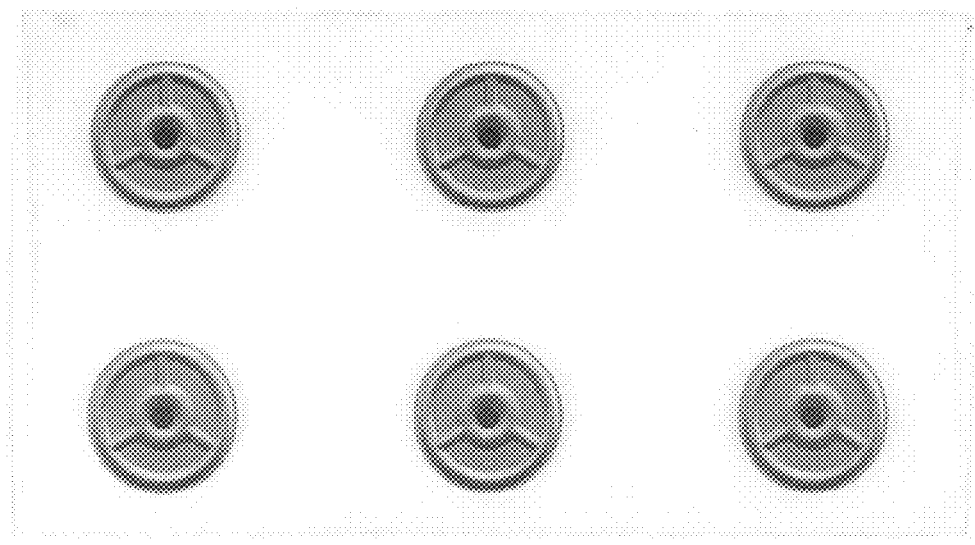

FIGS. 10A and 10B illustrates non-limiting examples of the attachment style where the printed image simulates that appearance of different types of mechanical plates and fasteners. FIG. 10A illustrates one type of mechanical plates and fasteners. FIG. 10B illustrates another type of mechanical plates and fasteners. The type of mechanical fastener is chosen based on application (e.g., for fastening an inseam versus fastening a membrane).

Figure 11:
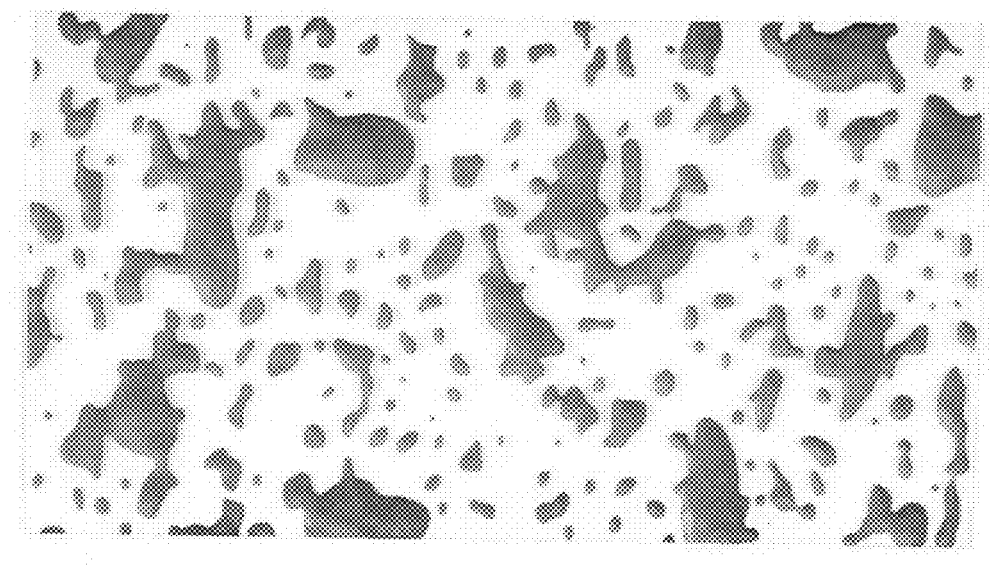
FIG. 11 illustrates a non-limiting example of the attachment style where the printed image simulates that appearance of a splatter pattern of a low-rise foam adhesive.

FIG. 11 illustrates a non-limiting example of the attachment style where the printed image simulates that appearance of a splatter pattern of a low-rise foam adhesive.

Figure 12:
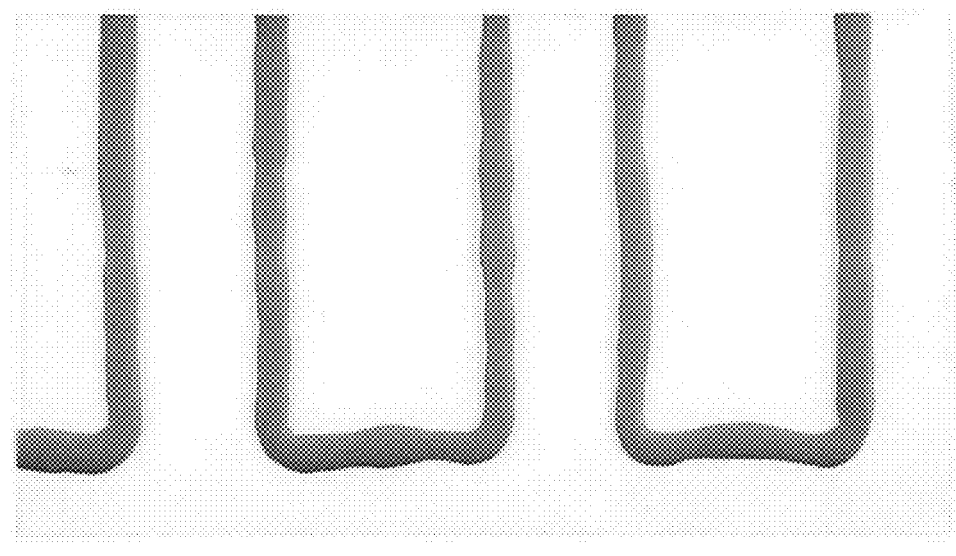
FIG. 12 illustrates a non-limiting example of the attachment style where the printed image simulates that appearance of a bead of a low-rise foam adhesive.

FIG. 12 illustrates a non-limiting example of the attachment style where the printed image simulates that appearance of a bead of a low-rise foam adhesive.

Figure 13:
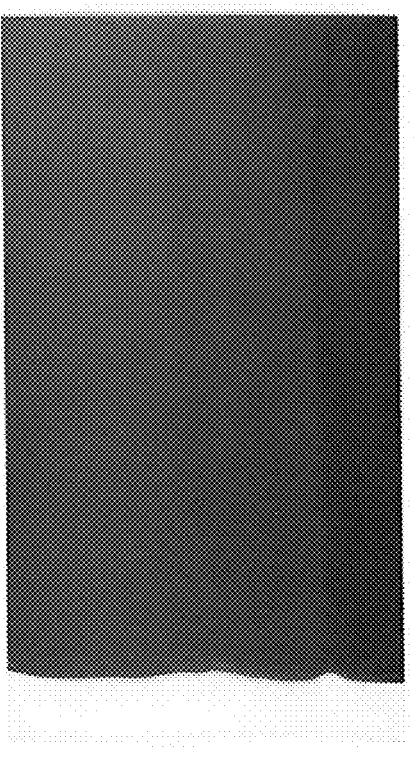
FIG. 13 illustrates a non-limiting example of an interchangeable roofing component where the printed image simulates that appearance of a hot asphalt layer, cold asphalt layer STPE adhesive layer or matrix bonding adhesive layer.
Figure 14:
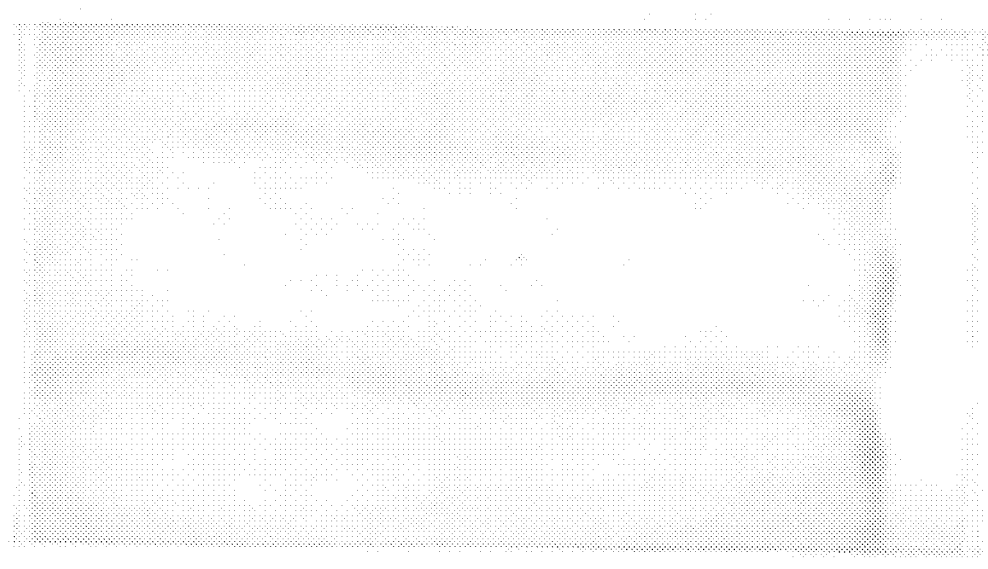
FIG. 14 illustrates a non-limiting example of the attachment style where the printed image simulates that appearance of a regular bonding adhesive layer.

In some embodiments, FIGS. 13 and 14 are photographs that illustrate different interchangeable roofing components. These interchangeable roofing components styles are mere representations of the numerous interchangeable roofing components styles that can be produced (e.g., by printing different styles on a plastic substrate). FIG. 13 illustrates a non-limiting example of an interchangeable roofing components where the printed image simulates that appearance of a hot asphalt layer, cold asphalt layer or STPE adhesive layer. FIG. 14 illustrates a non-limiting example of an attachment style where the printed image simulates that appearance of a regular bonding adhesive layer.

Figure 15:
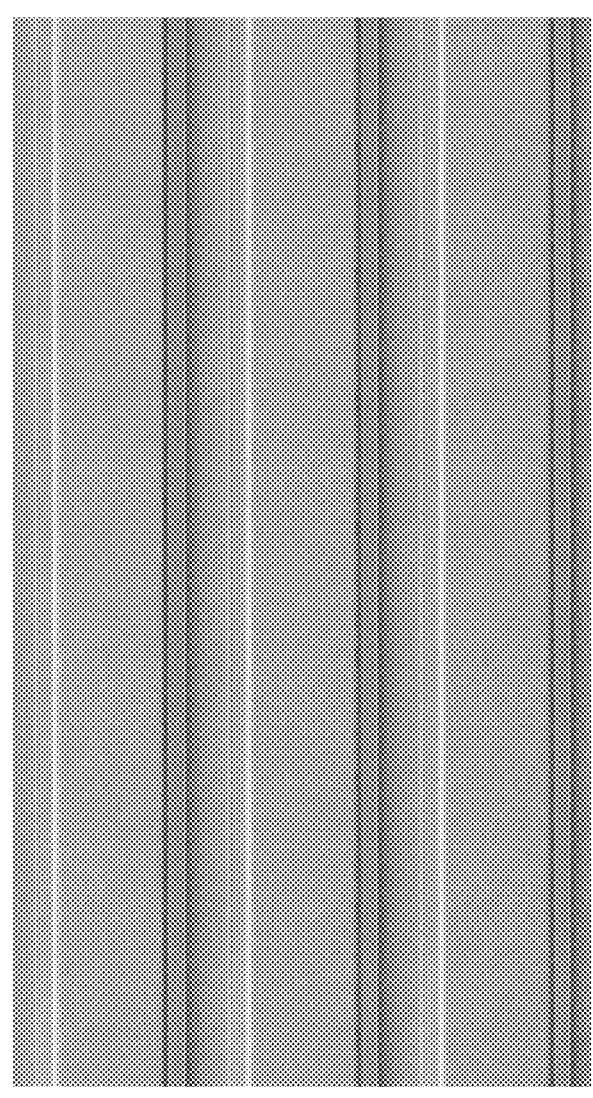
FIGS. 15 through 20 illustrates a non-limiting example of different styles of deck types where the printed image simulates that appearance of different roof deck materials.
Figure 16:
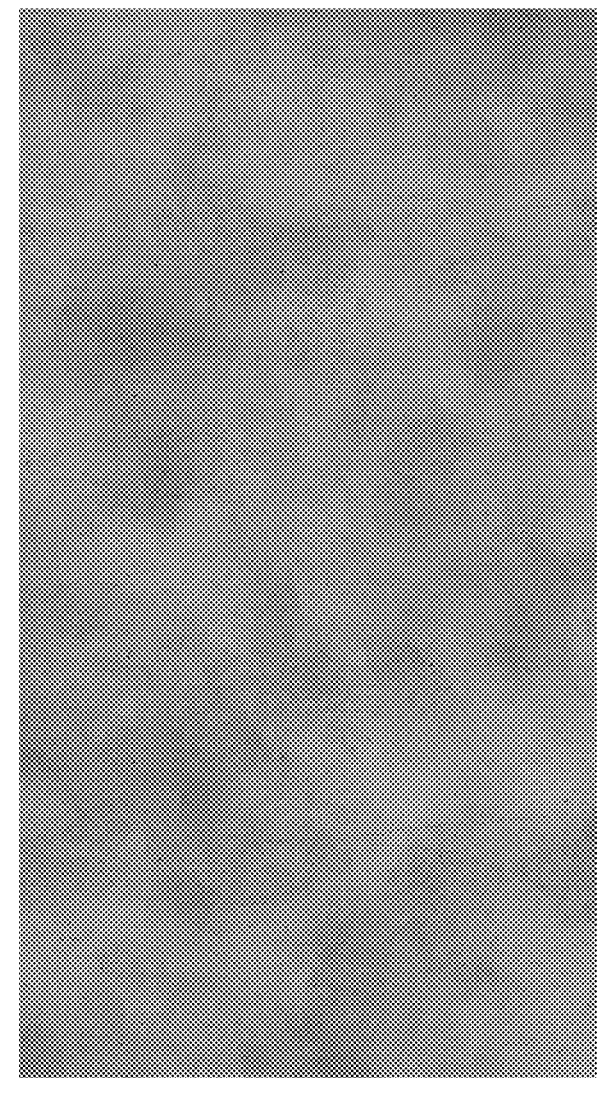
Figure 17:
Figure 18:
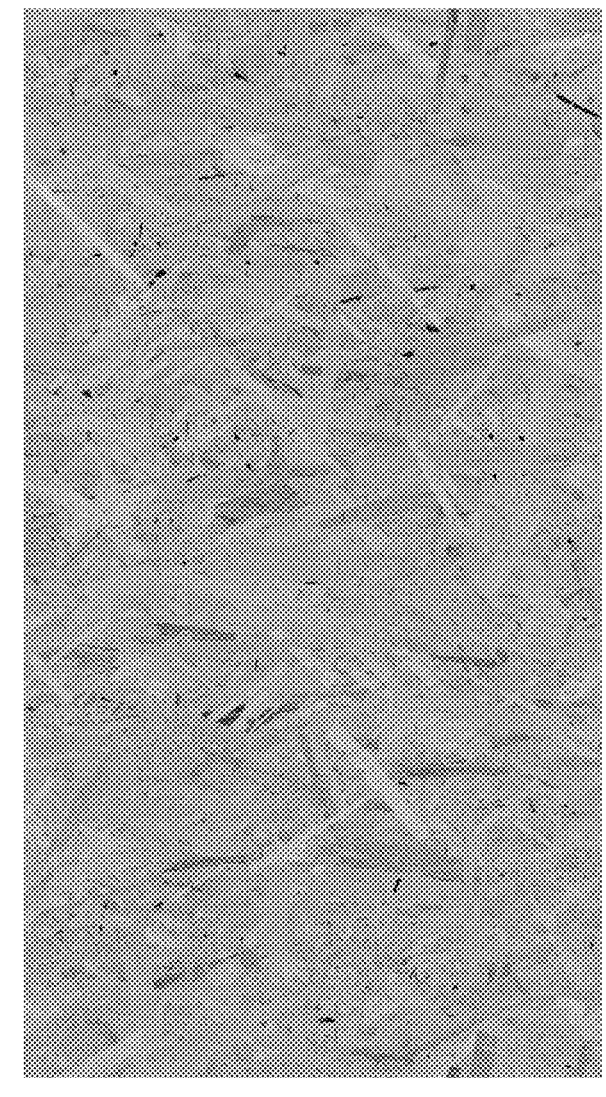
Figure 19:
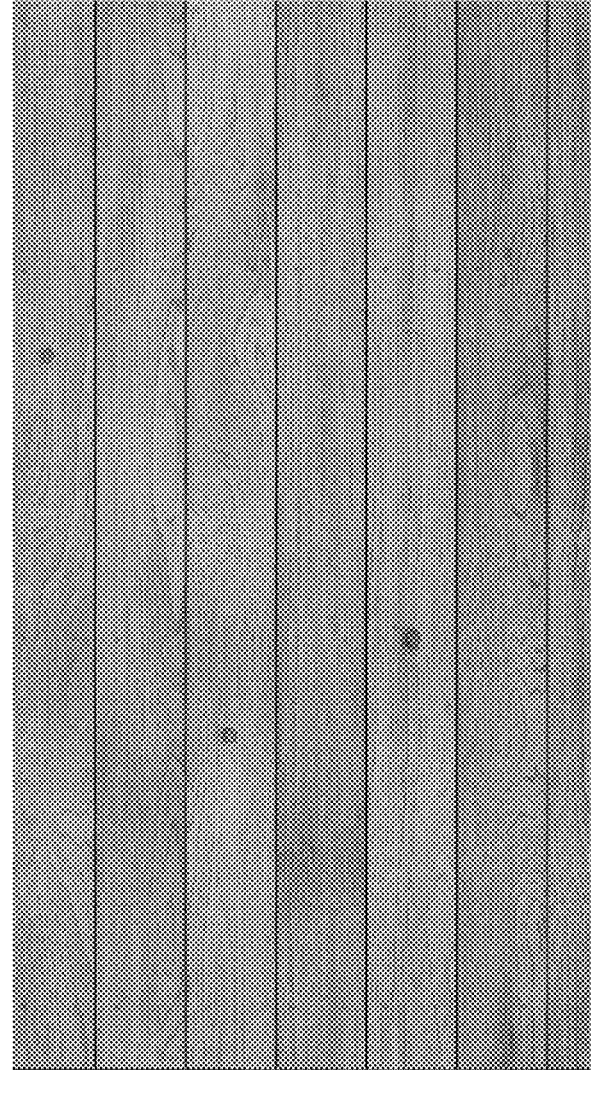
Figure 20:
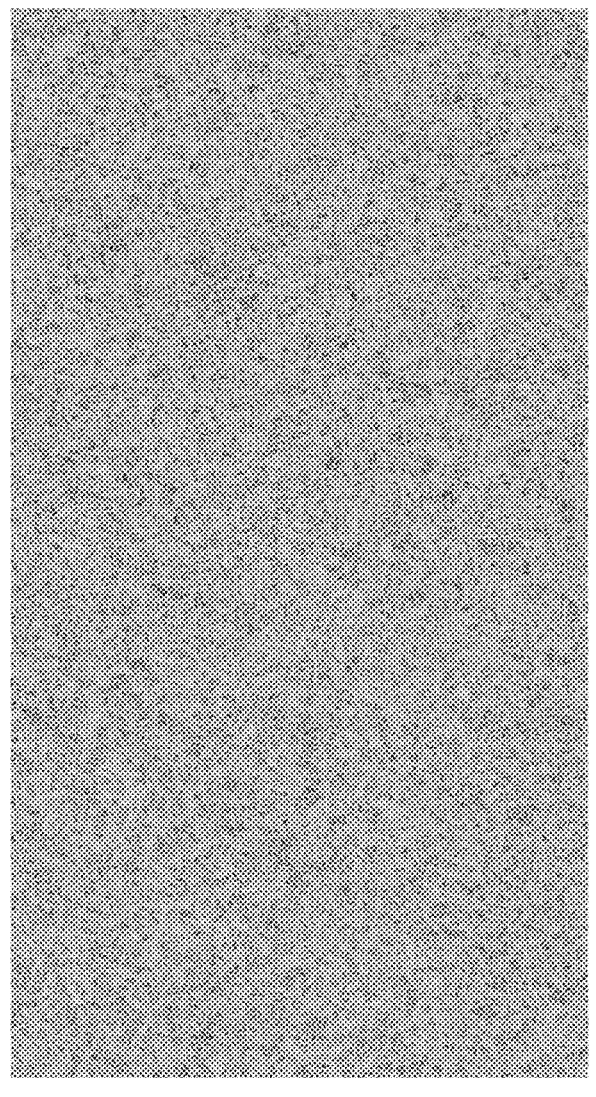

In some embodiments, FIGS. 15 through 20 are photographs that illustrate different interchangeable roofing deck materials. These interchangeable roofing deck styles are mere representations of the numerous interchangeable roofing decks styles that can be produced (e.g., by printing different styles on a plastic substrate). FIG. 15 illustrates a non-limiting example of an interchangeable roofing deck where the printed image simulates that appearance of steel deck. FIG. 16 illustrates a non-limiting example of an interchangeable roofing deck where the printed image simulates that appearance of concrete deck. FIG. 17 illustrates a non-limiting example of an interchangeable roofing deck where the printed image simulates that appearance of one type of wood deck. FIG. 18 illustrates a non-limiting example of an interchangeable roofing deck where the printed image simulates that appearance of OSB deck. FIG. 19 illustrates a non-limiting example of an interchangeable roofing deck where the printed image simulates that appearance of wood plank deck. FIG. 20 illustrates a non-limiting example of an interchangeable roofing deck where the printed image simulates that appearance of fiber deck.

What is claimed is:

1. A method of assembling a scale replica of a roofing system using a roofing mock-up kit, the method comprising:

(a) selecting a first modular interchangeable roofing component from a plurality of distinct interchangeable insulation layers;

(b) positioning the first modular interchangeable roofing component within a container;

(c) selecting a second modular interchangeable roofing component from a plurality of distinct interchangeable cover board layers;

(d) positioning the second modular interchangeable roofing component on the first modular interchangeable roofing component within the container;

(e) selecting a third modular interchangeable roofing component from a plurality of distinct interchangeable membrane layers;

(f) positioning the third modular interchangeable roofing component on the second modular interchangeable roofing component within the container to form a first scale replica of a first roofing system within the container;

(g) disassembling the first scale replica of the first roofing system; and (h) repeating steps (a) through (f) to form a second scale replica of a second roofing system within the container, wherein the second scale replica of the second roofing system is different from the first scale replica of the first roofing system.

2. The method of claim 1, wherein the first modular interchangeable roofing component is a rigid insulation sheet.

3. The method of claim 1, wherein the second modular interchangeable roofing component is a polyisocyanurate (polyiso) cover board layer.

4. The method of claim 1, wherein the third modular interchangeable roofing component is a thermoplastic olefin (TPO) membrane layer.

5. The method of claim 1, wherein each of the modular interchangeable roofing components has individual structural elements equivalent to conventional elements used in roofing construction for approximate obtainment of behavior of a real roofing condition.

6. The method of claim 1, further comprising selecting and positioning additional modular interchangeable roofing components, including at least one distinct interchangeable vapor barrier layer, within the container to form the scale replica of the roofing system.

7. The method of claim 1, further comprising selecting and positioning additional modular interchangeable roofing components, including at least one distinct interchangeable deck layer, within the container to form the scale replica of the roofing system.

8. The method of claim 1, wherein the modular interchangeable roofing components include printed images simulating the appearance of attachment styles, such as mechanical fasteners, bonding adhesives, or foam adhesive patterns.

9. The method of claim 1, wherein the modular interchangeable roofing components include layers of varying thicknesses, such as single-ply membrane thicknesses of 45 mil, 60 mil, or 80 mil, and cover board thicknesses of ¼ inch, ½ inch, or ¾ inch.

10. The method of claim 1, further comprising selecting and positioning a green roof layer, including vegetation, growing medium, filter fabric, and drainage layer, within the container to form the scale replica of the roofing system.

11. The method of claim 1, wherein the container comprises at least two clear sides made of plexiglass or similar material to visually display the contents within the container.

12. The method of claim 1, wherein the modular interchangeable roofing components include a combination of insulation layers, cover board layers, and membrane layers with factory-applied adhesive layers.

13. The method of claim 1, further comprising selecting and positioning modular interchangeable roofing components that simulate the appearance of roof deck materials, including steel deck, concrete deck, wood deck, or fiber deck.

14. The method of claim 1, wherein the modular interchangeable roofing components include surfacing layers, such as reflective coatings, gravel, or pavers, to protect the membrane from sunlight and weather.

15. The method of claim 1, further comprising selecting and positioning modular interchangeable roofing components that simulate modified bitumen roofing systems, including SBS or APP polymer-modified bitumen layers.

16. A roofing mock-up kit for assembling a scale replica of a roofing system, the kit comprising:

(a) a container having at least two sides, wherein at least one side is clear to visually display contents within the container;

(b) a plurality of modular interchangeable roofing components, including:

(i) at least one distinct interchangeable insulation layer;

(ii) at least one distinct interchangeable cover board layer; and (iii) at least one distinct interchangeable membrane layer;

wherein the modular interchangeable roofing components are configured to be assembled within the container to form a scale replica of a roofing system, and wherein the modular interchangeable roofing components are further configured to be disassembled and reassembled to form a different scale replica of a roofing system.

17. The roofing mock-up kit of claim 16, wherein the container comprises at least two clear sides made of plexiglass or similar material to visually display the contents within the container.

18. The roofing mock-up kit of claim 16, wherein the modular interchangeable roofing components include printed images simulating the appearance of attachment styles, such as mechanical fasteners, bonding adhesives, or foam adhesive patterns.

19. The roofing mock-up kit of claim 16, wherein the modular interchangeable roofing components include layers of varying thicknesses, such as single-ply membrane thicknesses of 45 mil, 60 mil, or 80 mil, and cover board thicknesses of ¼ inch, ½ inch, or ¾ inch.

20. The roofing mock-up kit of claim 16, further comprising modular interchangeable roofing components that simulate the appearance of roof deck materials, including steel deck, concrete deck, wood deck, or fiber deck.

\* \* \* \* \*